United States Patent Office 2,788,010
Patented Apr. 9, 1957

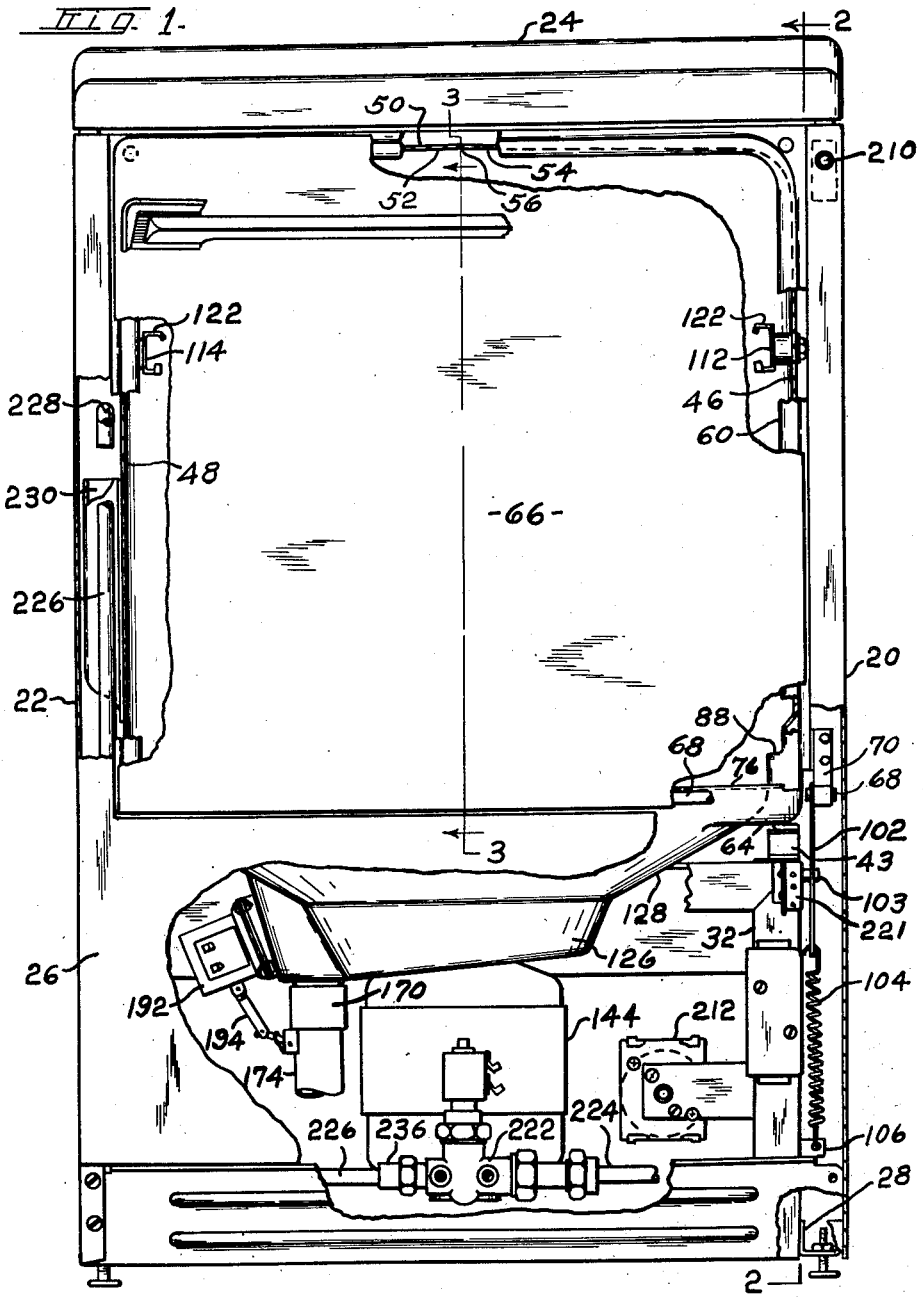

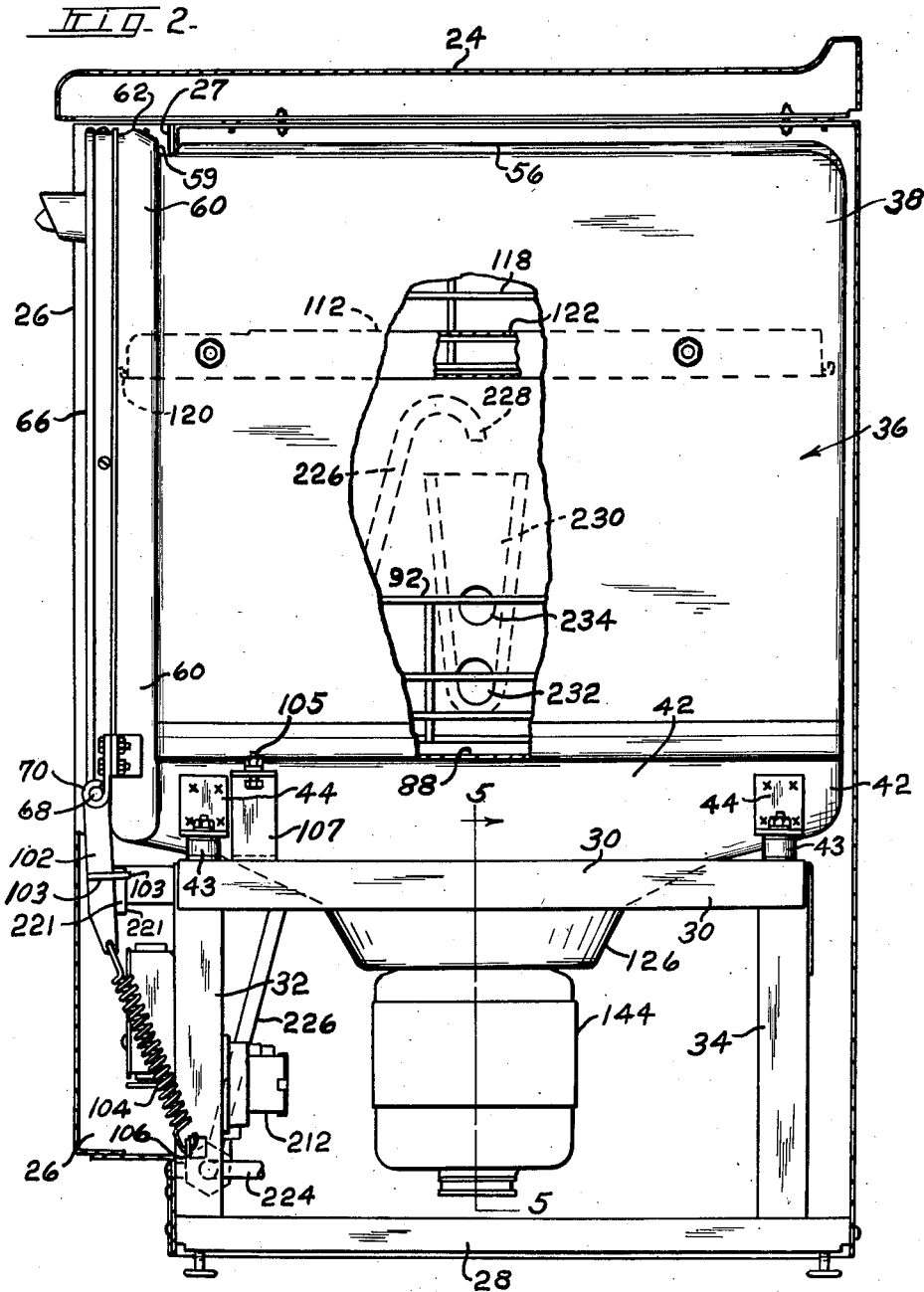

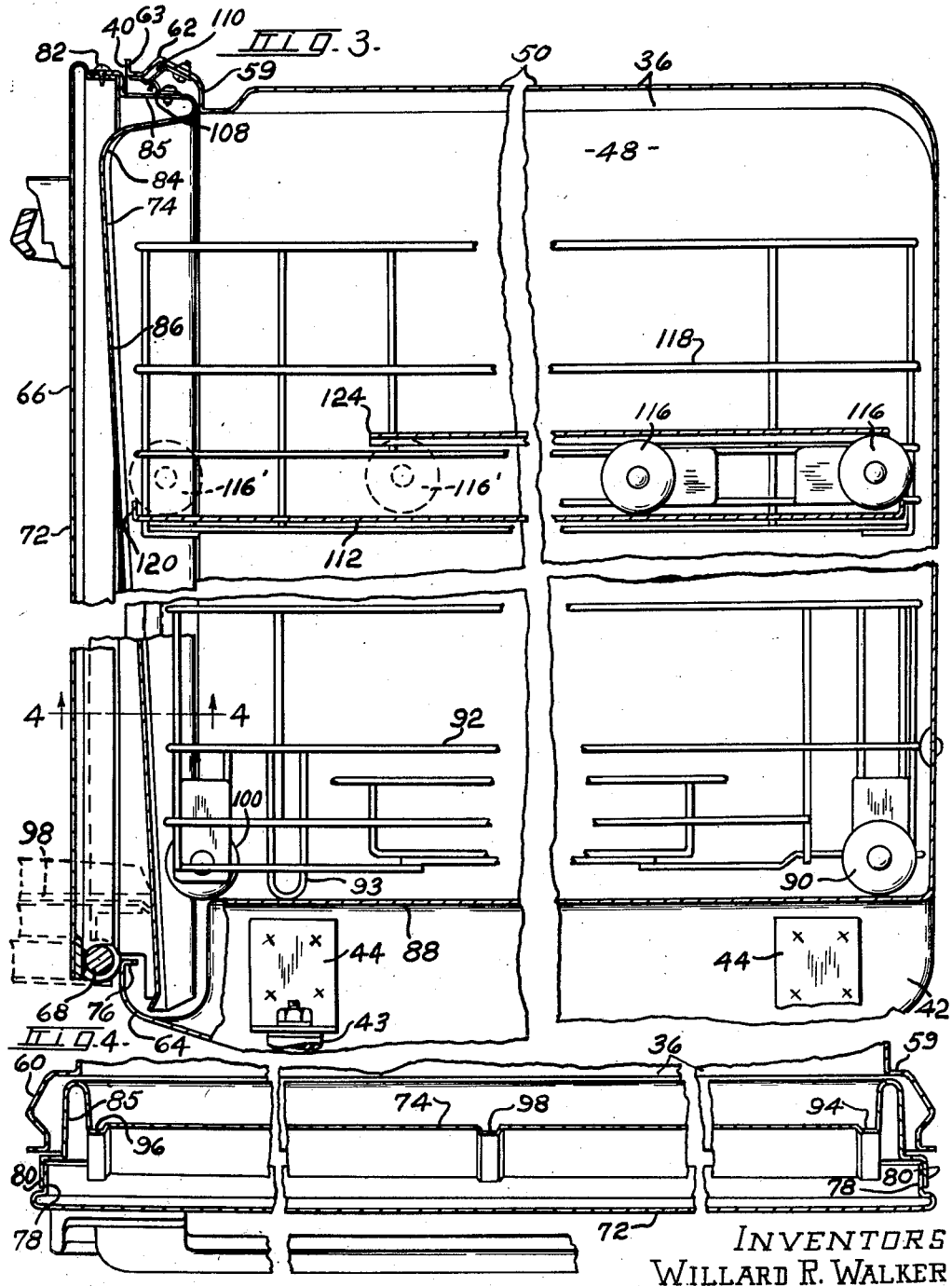

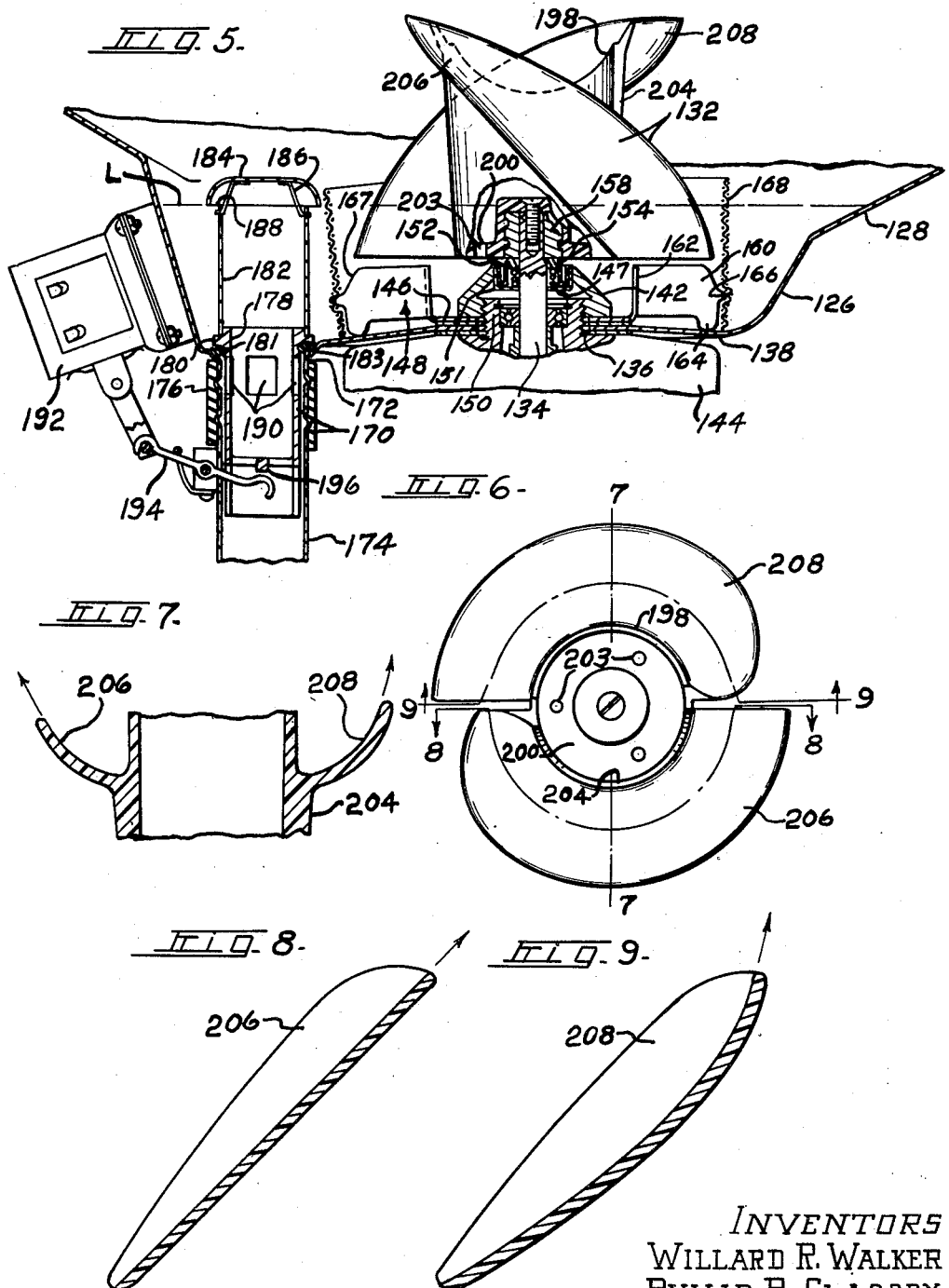

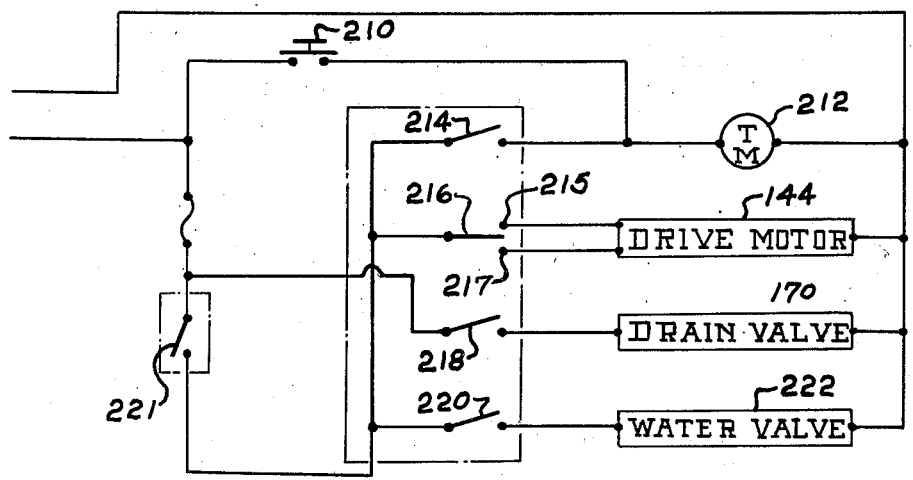

2,788,010

DISHWASHERS

Philip P. Glassey, Cazenovia, and Willard R. Walker, Syracuse, N. Y., assignors, by mesne assignments, to The Murray Corporation of America, Detroit, Mich., a corporation of Delaware Application August 13, 1952, Serial No. 304,136

3 Claims. (Cl. 134—104)

This invention relates to dishwashers, and more particularly to an apparatus for ridding the washer of foreign matter at frequent intervals during a normal sequence of operations in the operation of a dishwasher.

In automatic dishwashers, there is generally provided a washing stage during which dishes are subjected to detergent-laden wash water, after which such wash water is drained from the washer, and the dishes subjected to one or more stages of rinsing with a fresh supply of rinse water. Such washers generally employ a quantity of water in each stage which is recirculated into contact with the dishes in order to remove soil therefrom. To prevent recirculation of soil in the form of solids or other foreign matter removed from the dishes, filter screening is provided in the recirculatory path, which screening requires cleaning at the close of a normal sequence of dishwashing operations. Such solids or other matter as may be collected and held by the screening are, however, retained in the tub against the screening during rinsing operations, and contaminate the fresh rinsing water, since such solids exude soil and tend to break down by water action in time into particles capable of passage through the screening.

The present invention is directed to an apparatus by which the screen of a dishwasher is flushed clean whenever the wash water or rinse water is drained from the apparatus. The invention is further directed to an apparatus whereby the screen is power-flushed by reverse flow, to loosen and eliminate soil in the form of solids and other matter held by the screen, and in which loosened soil is immediately drained from the apparatus, before commencing a subsequent operation. Thus, solids held by the screen are eliminated at frequent intervals and are prevented from contaminating the rinsing operations.

The invention further has to do with a power-driven impeller type dishwasher, in which the impeller recirculates wash or rinse fluid by splash into contact with dishes, and is screened from receiving soil and foreign matter, and in which the impeller is reversed at the close of an operation to reverse flush the screen and drain the fluid.

A further feature of the invention is the application of a helically bladed impeller adapted to draw wash water through a surrounding screen for direct splash distribution upon the dishes, and in which such impeller, on reverse rotation, is adapted to reverse flush the screen to a drain suitably located for the purpose.

A further feature of the invention is the provision of a dishwasher adapted to clean itself in the normal dishwashing sequence of operations, and particularly such screening as is employed therein, so that upon the completion of a dishwashing sequence, the machine requires no manual cleaning.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

Figure 1 is a front elevation, with parts broken away and parts shown in section, to illustrate the general arrangement of the dishwasher, adapted for utilizing the washing and flushing cycle;

Figure 2 is an elevational view of the apparatus within the cabinet, parts being broken away and in section, the view being taken substantially on the line 2—2 of Figure 1, inside the cabinet side wall;

Figure 3 is a sectional view taken substantially on the line 3—3 of Figure 1;

Figure 4 is a sectional view taken substantially on the line 4—4 of Figure 3;

Figure 5 is an enlarged sectional detail view taken substantially on the line 5—5 of Figure 2, showing the impeller and screen construction;

Figure 6 is a top plan view of the impeller;

Figure 7 is a sectional fragmentary view taken substantially on the line 7—7 of Figure 6;

Figure 8 is a developed sectional view taken substantially on the line 8—8 of Figure 6;

Figure 9 is a developed sectional view taken substantially on the line 9—9 of Figure 6;

Figure 10 is a chart indicating a typical sequence of operation of the dishwashing machine; and Figure 11 is a wiring diagram.

Referring to Figures 1 and 2, there is shown a cabinet comprising side panels 20 and 22, a top deck 24 supported on the side panels, and a front panel and outer door frame 26 joined to the side panels as at 27, the upper portion of such frame being formed by the deck panel 24. The side panels are mounted upon a rectangular base structure composed of front and rear inverted U-members 32 and 34 connected at the bottom by channel members 28 and at the top by angle irons 30. Upon the angle iron frame members 30 is mounted a tub structure generally indicated as at 36. Such tub structure is composed of an upper substantially rectangular portion 38 having an open front end 40 and a lower sump portion 42. The entire tub structure is supported on the frame members 30 through resilient rubber mounts 43 and brackets 44 secured to the outer wall of the sump portion 42. The upper portion 38 of the tub has side walls 46 and 48 which connect with a top wall 50, composed of slightly slanted portions 52 and 54 meeting at a fore and aft extending center line 56.

The sides 46, 48, and top 50 at the forward end are provided with a tub door frame 60 and door 66, the tub frame comprising a flange 59, a flare or V-groove portion 62, and a second flange 63, all extending across the top and down the sides. The V-groove is adapted to form a stop to break any splash of water through the space between the door frame and the door. The frame 60 extends downwardly along either side of the door opening and into the sump portion 42 of the tub. Along the forward lower edge of the sump portion is a horizontal transverse channel 64 which lies substantially in the same plane as the flanged flare of the door frame 60.

The door 66 is hingedly mounted along its lower edge, there being provided a hinge bar 68 fixed to the door and pivotally extending at either end into hinge eyes 70 secured to the outside of the flare portion 62 near the lower ends of the side portions of the tub door frame 60. The door 66 comprises a front panel 72 and an inner panel 74, the latter of which is adapted to extend downwardly below the marginal edge flange 76 of the channel 64 and into such channel when the door is in closed position.

The front panel 72 and the inner panel 74 may be made of stampings having inwardly and outwardly directed marginal flanges 78 and 80, respectively, along the top and sides, which flanges are overlapped and secured together at spaced points as by fastening screws 82. The inner panel is offset forwardly as at 84 and the main body portion 86 thereof is disposed in inclined relation to the plane of the front panel 72. The marginal loop 85 formed by the offset extends adjacent the flange 59 around the tub door frame and loosely nests with a free fit within the flare portion 62.

The sump portion 42 of the tub joins the side walls 46 and 48 with an offset 88 extending fore and aft at either side to provide a trackway for the rear rollers 90 of a lower dish tray 92. The inner door panel 74 is provided with guide grooves 94 and 96 adapted to be aligned with the shoulders 88 when the door is in open position; for example, as indicated in dotted lines in Figure 3, such guide grooves cooperating with tray-carried loops 93. The inner door panel 74 is also provided with a center groove or track 98 adapted to engage and guide a forward centrally located roll 100 in the rack 92. The hinge bar 68 of the door carries at both ends arms 102 connected by springs 104, the latter extending to frame brackets 106 to counterbalance the door when opened. The arms engage adjustable stops 105 carried on frame-supported brackets 107 to limit the door open position, with the inclined body portion 86 of the inner door panel 74 substantially level. The right hand arm 102 carries a finger 103 adapted to actuate a switch 221 to close a circuit when the door reaches closed position (see Figure 1).

The upper flange 80 on the inner door panel 74 carries a spring detent 108 engaging a spring cam 110 secured in the flange 60 to yieldingly hold the door in closed position. The side walls 46 and 48 of the tub are provided with C-sectioned channel members 112 and 114 adapted to receive rollers 116 arranged in pairs on either side of an upper dish rack 118. The forward ends of the channels 112 and 114 are provided with a bent-up finger 120 which acts as a stop to prevent the rollers moving forward beyond the position indicated at 116' unless the forward end of the tray be lifted, the upper flange 122 of the channel member being discontinued as at 124 to permit removal of the upper rack in this manner.

Water is supplied to the washing chamber from a domestic hot water supply line 224, and flow is controlled by a valve 222. Water is admitted to the washing chamber or tub through a vacuum break, the pipe 226 leading away from the valve 222 extending upward alongside of the tub, and having a downwardly directed nozzle 228 projecting toward an open pocket 230 on the exterior of the side wall 48, such pocket communicating at the bottom through an aperture 232 in the wall 48 with the interior of the tub. A second port 234 above the aperture 232 connecting the pocket with the interior of the tub is provided as an air vent. The supply line is provided with a constant flow valve 236, whereby the quantity of water may be controlled by the length of time the valve 222 is open.

In the sump portion 42 of the tub, there is arranged a central downwardly offset sump proper 126, bounded by an upwardly and outwardly inclined wall 128 extending to the offsets 88 in the tub side walls, the rear tub wall 130, and the front tub door frame flange 76. Located in the center of the sump proper 126 is an impeller 132 directly mounted upon and keyed to a motor shaft 134 projecting upwardly through an aperture 136 in the bottom wall 138 of the sump. Such motor may have its bearing boss 150 projected through the bottom wall and threaded to receive a clamp nut 142. The clamp nut and boss, in addition to mounting the motor 144, provides means for securing the annular flange-like ring 146 of a vaned baffle member 148 in position beneath the impeller 132. The clamp nut 142 is provided with a suitable seal for the shaft 134, such seal, as shown, comprising a cup 151, an annular flexible U-member 152, and an annular seal ring 154 pressed by a compression spring 147 against the end surface of a drive block 158 cast in the impeller 132.

The baffle member 148 comprises the annular ring portion 146 held beneath the clamp nut 142 and a plurality of radially disposed vanes 160. In practice, three or more vanes are employed uniformly spaced about the ring portion 146, and each vane projects at right angles from a narrow upstanding support arm 162 formed as an integral extension part of the annular flange ring 146. Each of the vanes is provided with a foot 164 bearing against the bottom wall 138 of the sump and a radial nose portion 166, the nose portions of all of the vanes being adapted to engage in the mesh of a substantially cylindrical screen 168 positioned about the vanes 160 and the lower portion of the impeller 132. By such means, the screen is held in position, although it may be removed by distending its shape to release the screen from the nose portions. Each vane is inclined above the nose portion 166 as at 167 to facilitate replacing the screen.

Outside of the screen 168 is a drain 170, the bottom wall being provided with a drain sleeve 172 connected to a drain conduit 174 by a connecting sleeve 176. Within the sleeve 172, there is slidably disposed a cylindrical valve member 178 having an annular flange 180 at the top provided with a ring seal 181 adapted to engage the conical seat 183 located at the mouth of the drain opening. Such sleeve has an overflow extension in the form of a tubular member 182 extending upward to the desired water level L, which will normally limit the maximum quantity of water used by the machine. Such extension is provided with a bell cap 184 supported on spaced legs 186 above the lip 188 of the extension member. The valve member 178 has a number of large ports 190 in the body portion thereof below the seal ring 181, which, when the valve member is raised to open position, are located above the bottom wall of the sump proper, to afford a free rapid flow to drain. The valve member is lowered to closed position by energization of a solenoid 192 mounted on the outside wall of the sump proper, such solenoid acting through a lever 194, so that when the solenoid is de-energized, the lever lifts the valve member 178 to open position by engagement with the cross arm 196 within the valve member 172.

The impeller comprises a cup-shaped hub 198, the end or bottom wall 200 having rigidly embedded therein a drive block 158. Such wall is provided with one or more drain ports 203. The substantially cylindrical wall 204 has positioned around the exterior thereof two blades 206 and 208. The blades are approximately balanced so far as weight and position with respect to the axis of rotation are concerned. However, the blade 206 is helically arranged about the wall 204, whereas the blade 208 joins the wall along a line of increasing pitch from bottom to top. The blade 206 is adapted to distribute wash fluid into the outer areas of the dishwasher, whereas the blade 208 is adapted to throw water more upwardly and into the central region of the dishwasher. Rapid rotation of the impeller in a counterclockwise direction as viewed in Figure 6 will impel all water collecting in the sump upward, or upward and outward into the dishwashing area and effectively douse and flush all surfaces of the vessels contained upon the racks located above. In practice, for a standard domestic size of dishwasher, but five quarts of wash fluid are required, the impeller throwing such water into contact with the dishes as fast as the water drains back to the sump and reaches the level of the leading edges of the impeller blades. It will be seen that the vanes 169 prevent the water in the sump from whirlpooling, and improve the lifting effectiveness of the impeller blades.

The surrounding screen 168 during a washing or a rinsing operation, collects on its outer surface particles of food and other foreign matter, as a result of flow radially inward through the screen, thus preventing the recirculation of such solid matter, so that a dishwashing or a rinsing operation will be carried out by water from which solids have been strained.

When the washing operation is complete, the angle of the impeller blades is such that upon reverse rotation, the wash water contained within the sump, and particularly within the screen 168, is rapidly driven downwardly and thrown radially outward through the screen and caused to flow into the drain, the drain valve having been opened substantially simultaneously upon reversal of rotation for such operation. The reverse rotation of the impeller in conjunction with vanes 160 thus powerfully discharges all water within the screen outwardly through the screen, dislodging any solids or other foreign matter which has collected upon the outer surface of the screen whereby to carry such foreign matter down the drain. The arrangement thus described provides for washing with water which, in its initial and repeated circulation through the machine, will deposit all foreign matter upon the outside of the screen, where such matter is held so long as the impeller continues to draw water through the screen. After the washing operation is finished, such foreign matter will be reverse-flushed from the screen and caused to flow down the drain. Thus, after each cycle of operation, that is, washing with the impeller rotating in the lifting direction and draining with the impeller rotating oppositely, the dishwashing chamber, and particularly the screen, is flushed clean. It will be seen that such solids are collected upon the screen by gravity flow, whereas upon reverse flow, a power flush is effected. Thus, dislodgment is assured by the superior force of the reverse flush.

Since dishwashing generally requires a sequence of operations, such as washing, followed by rising one or more times, and in addition, pre-rinsing if desired, each of which may in utilizing the present invention comprise a cycle essentially consisting of washing, ending in a power flushing of the screen, there is provided a sequence of operations in which the screen is reverse-flushed at frequent intervals. Thus, instead of the screen retaining such foreign matter throughout the entire sequence of operations, the screen is successively and positively flushed clean, so that all subsequent operations such as rinsing are performed with practically uncontaminated water. Any trace of foreign matter left after washing will be removed before the first rinse and any trace remaining after will in the first rinse be collected on the screen, and be eliminated before the final rinse. Further, since the screen is flushed clean over its entire area, the screen offers no substantial impediment to circulation of rinsing water in the subsequent rinsing cycles, so that rinsing action is completely effective and benefits from the free, unimpeded circulation through the screen. Further, the screen is so disposed as to effectively intercept during circulation substantially all foreign matter, holding such matter under light flow until the power reverse flushing operation takes place.

Because of the power flushing of the screen at the end of each step, the usual necessity for careful scraping and cleaning most of the foreign matter from the dishes before insertion in the dishwasher is lessened, since the washer operates in the first cycle to eliminate and flush away substantially all foreign matter, leaving the machine and particularly its screen, clean and clear for the subsequent cycles of the sequence for effective washing or rinsing, as may be the case. Further, since the screen is periodically flushed, a finer mesh of screen may be employed for removing foreign matter, without danger of such screen remaining clogged in the following cycles of the sequence.

In Figure 10, there is shown a time chart for a wash sequence, and in Figure 11, there is a diagrammatic circuit showing various switches operated by a timer motor through suitable cams, not shown but well understood in the art, to effect a sequence of operations as shown in Figure 10. In Figure 11, there is a manual start switch 210 which completes a circuit through a timer motor 212, which motor is drivably connected to actuate through cams, switches 214, 216, 218, and 220. Cam-actuated switch 214 completes a circuit to the timer motor so that the starting switch 210 need be closed but for a brief moment to initially start the timer motor. Switch 216 is actuated so as to make connection to contact 215 to cause the drive motor to rotate in one direction or make connection to contact 217 to cause the motor to rotate reversely. Swith 218, when closed, operates the drain valve to closed position, and switch 220 controls the water inlet valve. A door-operated switch 221 for stopping the motor, timer, and closing the water valve instantly, should the door be opened, is also provided as a safety feature. The drain valve circuit, however, is preferably not opened by such switch, since if the circuit were opened, the drain valve would open, causing draining without the flushing operation occurring on motor reversal. The screen might thus be left contaminated with foreign matter, and the advantage of the power flush be lost.

In the chart of Figure 10, it will appear that the sequence is started after the racks are loaded and a quantity of suitable detergent added, at which time the timer motor is energized by closing switch 210, whereupon the timer closes switch 214 as at 230. The timer continues to operate until the end of the sequence at 232, when the timer motor cam opens the switch 214. The sequence of operations is completed during this interval, which as indicated, is of eight or nine minutes duration.

Shortly after the timer motor closes switch 214, the hot water valve switch 220 is caused to close as at 234, energizing the valve 222 admitting five quarts of hot water during the period commencing at 234 and ending at 236 when such valve closes. The constant flow device, and the length of the time as indicated between 234 and 236 controls the water quantity.

Shortly after the water valve switch is closed, the drain valve switch 218 is closed as at 238 and the motor switch 216 is closed through contact 215 to operate the motor in the wash direction. The delay in closing the drain valve permits any initial cold water in the line to pass out the drain. The motor operates until the circuit is opened as at 240. When the motor has stopped rotation in the wash direction, a circuit is closed through reverse contact 217 commencing reverse rotation as indicated at 242. Simultaneously, the drain valve, which was closed, is opened as at 244, whereupon the reverse rotation of the impeller results in reverse flushing of the screen previously referred to, and all detergent-laden wash water within the screen is quickly thrown radially outward through the screen and flushed down the drain, carrying with it solids caught by the screen. The reverse operation is of short duration terminating as at 246.

Thereafter, the cycle is in substance repeated for a rinse, the motor being rotated in a wash direction commencing at 248, simultaneously with the closing of the drain valve as indicated at 250, and the opening of the water valve, as indicated at 252. The water valve 222 is closed as indicated at 254. The motor is subsequently stopped as indicated at 256, and then reversed by switch 215 making contact at 217, and the drain valve opened as indicated at 258 and 260, respectively. A rinse cycle is thus completed. A second rinse cycle may then be performed, by starting the motor, closing the drain valve, and opening the water valve as at 262, 264, and 266, respectively, and thereafter closing the water valve as at 268, subsequently stopping the motor at 270, and then reversing the motor and opening the drain valve as at 272 and 274, respectively. Thereafter, the reverse operation of the motor is stopped as at 276, after which the timer clock switch 214 is opened, and the dishwashing sequence completed.

It will appear from Figure 3 that the door does not make a tight fit with the tub door frame, nor is a seal provided, such being not required due to the door and door frame construction and the small quantity of water used in any cycle of operation. Actually, the quantity used does not materially exceed the capacity of the sump proper. The door, however, in conjunction with the flared tub door frame, blocks off splash effectively, causing splash to run down the tub door frame and collect in the channel 60, thence flowing to the sump. When the washing sequence and rinsing sequence are completed, the free fit of the door in the frame permits air circulation through the tub sufficient to allow escape of steam and vapor, so that drying will take place without resulting in condensation within the tub or upon the hot dishes.

Although a single embodiment of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. In a dishwashing apparatus, a vat having a bottom wall, a vertical axis impeller mounted above the bottom wall in spaced relation, said impeller having blades adapted to lift and throw wash water upwardly and outwardly when rotated in one direction, and to impel wash water downwardly and outwardly when rotated in the other direction, a reversible motor for driving said impeller in either direction, a plurality of radial vanes mounted on the bottom wall and positioned beneath the impeller, a substantially cylindrical screen open at its top for direct communication to said vat surrounding the lower part of said impeller and supported upon said vanes, and a drain outlet for said vat located in the bottom wall, outside said screen.

2. In a dishwashing apparatus, a vat having a bottom wall, a vertical axis impeller mounted above the bottom wall, said impeller having a blade adapted to lift and throw wash water upwardly and outwardly when rotated in one direction, and to impel wash water downwardly and outwardly when rotated in the other direction, radial vanes mounted on said bottom wall immediately beneath said impeller, a screen surrounding the lower part of said impeller and detachably secured to said vanes, said screen extending to said bottom wall, and a drain outlet for said vat located in the bottom wall, outside said screen.

3. In a dishwashing apparatus, a vat, a central shallow sump having a bottom wall and surrounding sloped wall, a vertical axis substantially helical bladed impeller mounted centrally within the sump in spaced relation to the bottom wall, stationary radial vanes mounted beneath said impeller, a screen closely surrounding the lower portion of said impeller and said vanes, a drain from said sump located wholly outside the screen, a reversible motor for driving said impeller in one direction for drawing water radially inward through said screen and lifting and diffusing water throughout said vat for washing, and for driving said impeller in a reverse direction to drive water radially outward through said screen to said drain for a flush drain.

References Cited in the file of this patent

UNITED STATES PATENTS

| | | |
|---|---|---|
| 1,382,117 | Opocensky | June 21, 1921 |
| 2,000,720 | Snyder et al. | May 7, 1935 |
| 2,287,628 | McMahan | June 23, 1942 |
| 2,425,620 | Kempton | Aug. 12, 1947 |
| 2,620,811 | Walker | Dec. 9, 1952 |
| 2,657,697 | Walker | Nov. 3, 1953 |